Figure 3:
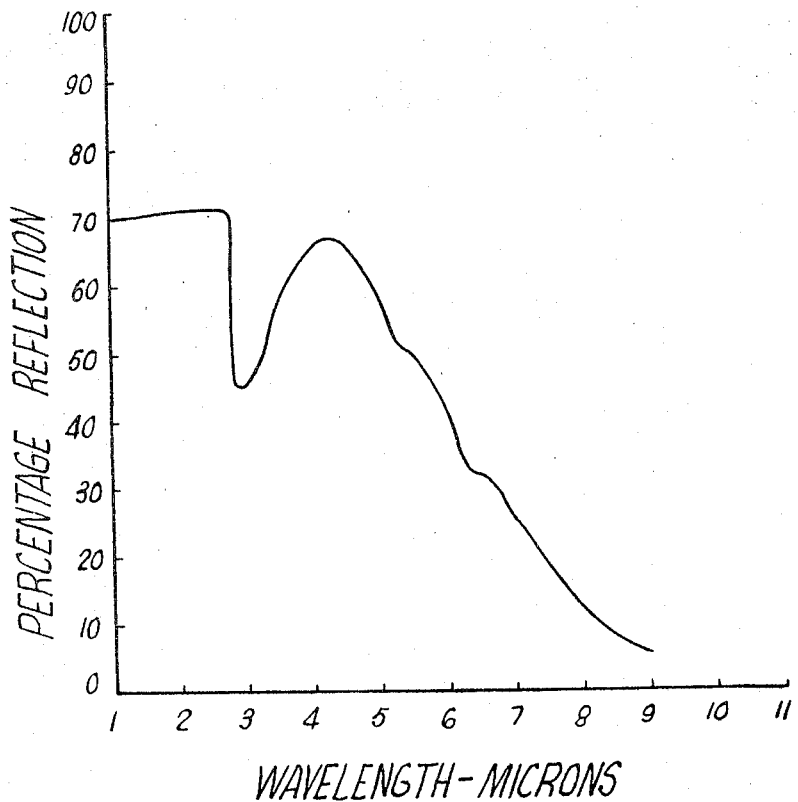

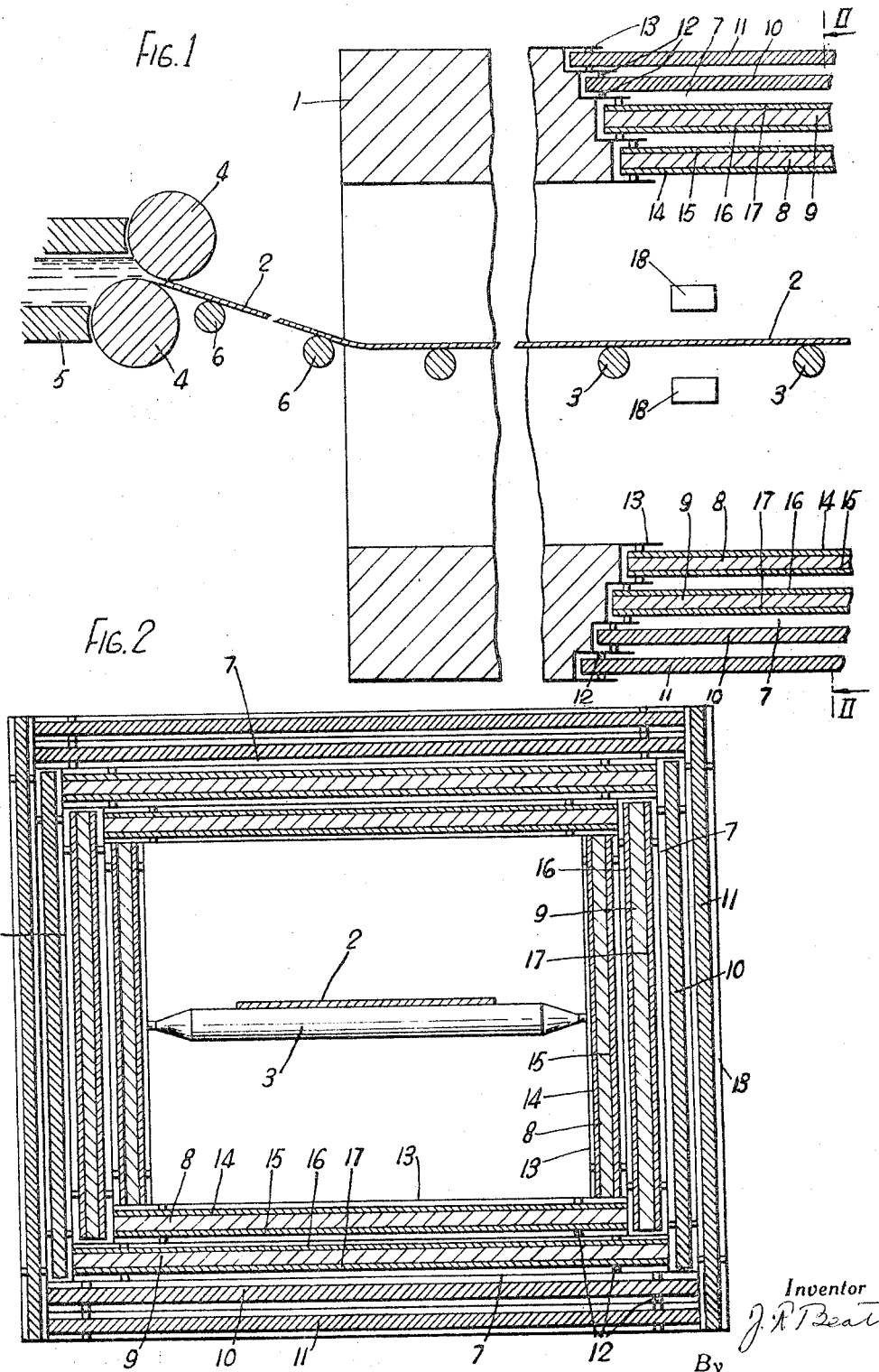

United States Patent Office 3,294,513
Patented Dec. 27, 1966

3,294,513
APPARATUS FOR ANNEALING GLASS
John Reginald Beattie, Maghull, near Liverpool, England, assignor to Pilkington Brothers Limited, Liverpool, England, a company of Great Britain
Filed Apr. 30, 1963, Ser. No. 276,834
Claims priority, application Great Britain, May 3, 1962, 17,083/62
5 Claims. (Cl. 65—194)

This invention relates to apparatus for annealing glass, and more particularly to such apparatus including an annealing lehr for annealing glass as it is advanced through the lehr. The invention also relates to a method of annealing glass.

It is well known that in the cooling of glass, excessive or local residual strains may be set up in the glass and accordingly it is conventional to pass glass, for example, in ribbon form, through an annealing lehr in which the glass is cooled very slowly through the annealing range, so that temperature differences in the glass are eliminated so far as possible at the time that the glass is cooled through the strain point.

The annealing lehrs which have generally been used hitherto for this purpose have been constructed of refractory material which has a high heat capacity and which has consequently made it difficult to compensate for local variations in temperature which may occur in the glass being annealed.

It is a main object of the present invention to provide an annealing lehr in which the rate of heat loss from the glass as it is cooled through the annealing range of the glass may be controlled, so that an improved method of annealing is used and there is a consequently greater freedom from strain in the annealed glass article.

According to the present invention there is provided apparatus including an annealing lehr for annealing glass as the glass is advanced through a lehr, characterised by the lehr including at least in the neighbourhood of the annealing zone, a cavity wall structure formed by a plurality of spaced partitions, one or more of the spaced partitions being coated on at least one surface with a coating comprising a refractory material to establish on that surface a layer having a surface reflectivity greater than its surface absorptivity at temperatures of the order of the annealing temperature of the glass, whereby a desired thermal insulation is obtained at the zone in the lehr where the temperature of the glass is approaching the upper temperature of the annealing range of the glass, and the glass is cooled slowly through the annealing range.

Because of the low thermal capacity of this form of construction, it is possible to obtain greater control of the temperature within the annealing zone than was possible with a refractory lehr, and consequently greater control in the rate of cooling of the glass is achieved.

Preferably the walls of the lehr are comprised by the cavity wall structure or structures and according to this aspect of the invention, there is provided apparatus including an annealing lehr for annealing glass as the glass is advanced through the lehr, characterised by the walls of the lehr, at least in the annealing zone, comprising cavity wall structures formed of a plurality of spaced partitions, one or more of the spaced partitions being coated on at least one surface with a coating comprising a refractory material, to establish a layer on that surface having a surface reflectivity greater than its surface absorptivity at temperatures of the order of the annealing temperature of the glass, whereby there is obtained a desired thermal insulation with a minimum thermal capacity at the zone in the lehr where the temperature of the glass is approaching the upper temperature of the annealing range of the glass and the glass is cooled slowly through the annealing range.

The present invention has particular application in the annealing of glass in ribbon form in a horizontal lehr and according to this aspect therefore, the present invention provides apparatus including a horizontal lehr for annealing flat glass in ribbon form, the lehr comprising conveyor rolls for advancing the glass ribbon through the lehr, and cavity wall structures formed by a plurality of spaced partitions, one or more of the spaced partitions being coated on at least one surface with a coating comprising a refractory material, to establish a layer on that surface having a surface reflectivity greater than its surface absorptivity, at temperatures of the order of the annealing temperatures of the glass, and the cavity wall structures being arranged to restrict heat loss from the glass ribbon at the zone in the lehr where the temperature of the glass ribbon is approaching the upper temperature of the annealing range of the glass, whereby the glass ribbon is cooled slowly through the annealing range.

Preferably the refractory material is calcium fluoride or a refractory oxide material selected from the group including magnesium oxide, zinc oxide, calcium oxide, alumina, molybdenum trioxide, lead oxide and zirconia including 5% calcium oxide.

In order to be suitable for coating the spaced partitions in a lehr according to the present invention, it is not necessary for the refractory material or refractory oxide material to have a heat reflectivity greater than its heat absorptivity over the whole range of infrared wavelengths which are emitted by the glass being annealed. A very high proportion of the radiations emitted by the glass falls within the wavelength range 2.5 microns to 6 microns and accordingly, the essential feature of the refractory materials or refractory oxide materials is that they shall have a heat reflectivity greater than their heat absorptivity at a substantial proportion of wavelengths in this range. Of the examples of suitable materials mentioned above, magnesia and zirconia, including 5% of calcium oxide, are greatly preferred.

From the preceding discussion, it will be appreciated that a coating of a refractory material such as a refractory oxide material, will be effective when the material is applied to the inner surface of one of the partitions comprising a cavity wall structure in a lehr according to the present invention. However, the characteristics of the refractory materials, that their heat reflectivity is greater than their heat absorptivity, also means that their heat emissivity will be less than 50%, so that the provision of a layer of a refractory material on the outer wall of one or more of the partitions will reduce the heat lost by radiation from that partition in an outward direction.

Advantageously, a layer of the refractory material is present on both surfaces of the innermost partition and on the inner surface of the partition next to the innermost partition.

Convenient the said next partition also has a layer of the refractory material on its outer surface.

Desirably the spaced partitions are assembled as individual cavity wall structures, each assembly forming a unitary structure.

The present invention also comprehends a method of annealing glass comprising cooling the glass through its annealing range and providing one or more surfaces of a refractory material having a surface reflectivity greater than its surface absorptivity, at temperatures of the order of the annealing temperatures of the glass, whereby heat lost from the glass is radiated back to it as the temperature of the glass approaches the upper temperature of the annealing range and enters the annealing range, and the glass is cooled slowly through the annealing range.

The invention will be more clearly understood from the following detailed description of a preferred embodiment thereof, taken in conjunction with the accompanying drawings, in which:

FIGURE 1 is a central vertical section of a horizontal lehr through which a ribbon of glass emerging, for example, from a pair of water-cooled rollers is passed, FIGURE 2 is a transverse section of the lehr of FIGURE 1, taken along the line II—II, and FIGURE 3 shows the percentage reflection of a refractory oxide which may be used as the coating on the partitions forming the walls of the lehr according to FIGURES 1 and 2.

In the drawings, like reference numerals designate the same or similar parts.

Referring to FIGURES 1 and 2 of the drawings, there is shown a horizontal lehr 1 of generally rectangular cross-section, through which a ribbon 2 of glass is carried on conveyor rolls 3. In the embodiment of the invention shown, the glass ribbon 2 is formed from a stream of glass passing between water-cooled forming rolls 4 which are situated directly at the lip of the shallow channel of a tank forehearth 5. The glass ribbon 2 formed by the rolls 4 is passed over a series of tray rolls 6 until it reaches the mouth of the lehr 1.

When the glass ribbon 2 enters the lehr 1, it has cooled to a temperature which is still above the upper temperature limit of the annealing range. In general the critical annealing zone for present day flat glass is at temperatures of the order of 570° C. to 480° C. As the glass ribbon is carried through the lehr 1, however, it cools through the annealing range and when the glass ribbon emerges from the lehr, it has cooled to a temperature at which it may be cut into pieces of any desired size.

The cavity wall structures indicated generally by the reference numeral 7 comprise the walls of the lehr 1 in that region where the glass ribbon is cooling from a temperature above the upper temperature of the annealing range to the lower limit of the annealing range.

Each of the cavity wall structures 7 consists of a parallel series of heat reflecting partitions 8, 9, 10 and 11 which are held in spaced relation by refractory spacers 12 carried by rigid frames 13. The rigid frames 13 hold the respective partitions 8 to 11 together as unitary structures and the spaced relation of the partitions ensures that heat exchange between the partitions is mainly by radiation.

The heat reflecting partitions 8 to 11 which form the cavity wall structures 7 are respectively an innermost sheet of heat-resisting steel, such as the material obtainable under the name Nimonic 75, a stainless steel sheet and two outer sheets of aluminium. However, the innermost partition 8 of Nimonic 75 carries on each of its surfaces layers 14 and 15 of zirconia plus 5% of calcium oxide, while the next partition 9 has similar layers 16 and 17 of zirconia plus 5% of calcium oxide on both its surfaces.

The layers 14 to 17 applied to the surfaces of the partitions 8 and 9 are preferably about .005" in thickness and are particulate coverings in nature rather than films of zirconia plus 5% of calcium oxide. The layers 14 to 17 may conveniently be deposited on the surfaces of the partitions 8 and 9 as an atomised spray so that the particles sinter together to form the respective layers.

In FIGURE 3, there is shown the curve of the percentage reflection of zirconia plus 5% of calcium oxide against the wavelength in microns of radiations falling on it. It will be seen that for the portion of the spectrum in which the majority of radiations are emitted by the glass being cooled, that is to say, from 2.5 to 6 microns, the percentage reflection of zirconia plus 5% of calcium oxide is in excess of 50% over a substantial part of the range.

The unitary cavity wall structures 7 of heat reflecting partitions are located in positions to form the walls of the lehr 1 in and near the annealing zone of the lehr by the rigid frames 13 being of stepped outline, which fit into corresponding steps in the normal refractory material of which the other parts of the annealing lehr 1 are formed. The rigid frames 13 are held to the refractory parts of the lehr 1 by any well known mechanical means, not shown.

The heat reflecting partitions may be formed in a corrugated manner in order to increase their rigidity, and the spacing between the individual partitions is of the order of 1" to 2".

There is also provided in the annealing zone of the lehr 1, and particularly in the part of the annealing zone where the glass ribbon is at a temperature near the upper temperature of the annealing range, auxiliary heating means 18. The auxiliary heating means 18 which is conveniently electrically operated, slows down the rate of heat lost from the glass ribbon 2 and is also used to effect a temperature control across the width of the ribbon.

As the glass ribbon 2 passes between the cavity wall structures 7, it radiates heat outwardly to the innermost partitions 8 of these structures. The presence of the layer 14 on the inner surface of the innermost partition 8 increases the reflectivity of the surface of the partition 8 so that a greater quantity of the radiation emitted by the glass ribbon 2 is reflected back to it.

The remainder of the radiation received by the layer 14 is absorbed and heats the partition 8. Consequently the partition 8 itself radiates both inwardly and outwardly. However, in consequence of the layer 15 of zirconia plus 5% calcium oxide on the outer surface of the partition 8, the quantity of energy radiated by the partition 8 outwardly to the next innermost partition 9 is lower than would be the case in the absence of the layer 15.

The layers 16 and 17 on the next innermost partition 9 act in a similar way to the layers 14 and 15 on the innermost partition 8.

Although the two outer partitions 10 and 11 have not been shown to have layers on their surfaces similar to the layers 14 to 17, it is to be understood that similar layers may be provided on these two outer partitions 10 and 11, if desired. In any event, the outer partitions 9, 10 and 11 reduce the rate of heat lost from the inner wall of the lehr to the atmosphere where the cavity wall structures form the walls of the lehr when compared with the early part of the lehr 1 where the walls are of heat refractory material.

However, a more important feature of the annealing zone of the lehr having cavity wall structures 7 is that the low thermal capacity of the structures allows a very quick time response in the lehr temperature to the auxiliary heating than is the case when there are refractory walls in the annealing zone of the lehr.

The use of a lehr 1 according to the present invention achieves a reduction in the rate of cooling of the glass ribbon 2 while the glass is in the annealing range so that time is provided for the temperature differences in the glass ribbon 2 to even themselves out before the glass ribbon is cooled below the strain point of the glass.

As a modification of the apparatus described with reference to the drawing, it is convenient in some circumstances to have special arrangements, either of the partitions 8 to 11 or of the layers 14 to 17 on the surfaces of the partitions 8 and 9 in order to effect differential cooling between the centre portion and the marginal portions of the glass ribbon 2.

Although the present invention has been described as applied to a horizontal annealing lehr, it will be appreciated that it may equally be applied to a vertical annealing tower. It will also be understood that the practice of the present invention is not limited to the use of a cavity wall structure in only the part of the lehr in and around the annealing zone. The cavity wall structures of heat reflecting partitions may, if desired, be used over the whole range of the lehr; such assemblies used on either side of the annealing zone contain fewer partitions, so that a higher rate of cooling is obtained. The rate of cooling of the glass below the annealing zone, however, must be controlled to prevent the introduction into the glass of stresses sufficient to cause breakage.

Although the coating of zirconia plus 5% calcium oxide is conveniently deposited as an atomised spray, it is more convenient with some of the other refractory materials to apply them as a slurry or paste which is baked onto the base metal of the partition to form the particulate covering. Also it is within the ambit of the invention to apply the refractory material or refractory oxide material as a mixture with another material, but the mixture must be such that the particulate covering obtained has the properties hereinbefore set out.

It is found that when a glass ribbon is annealed using an annealing lehr according to the present invention, glass sheets obtained from the ribbon may be cut subsequently with a very considerably reduced loss of the glass due to unintended fractures caused by the stress in the glass.

I claim:

1. Apparatus including an annealing lehr having a low thermal capacity and adapted for controlling the rate of heat loss from the glass as it is cooled through the annealing range of the glass, the lehr comprising, at least in the neighbourhood of the annealing zone, a cavity wall structure of which each wall consists of a plurality of partitions extending along the wall face to face and spaced in directions transverse to the wall, at least one of the spaced partitions in each wall of the cavity wall structure having a coating of refractory material forming a reflecting surface, said refractory material being such that, in the temperature range of 570° C. to 480° C., said material has a surface reflectivity greater than its surface absorptivity at a substantial proportion of wavelengths between 2.5 microns and 6 microns for inhibiting the transmission of heat through the cavity wall structure from the interior of the lehr.

2. Apparatus including an annealing lehr having a low thermal capacity and adapted for controlling the rate of heat loss from the glass as it is cooled through the annealing range of the glass, the lehr comprising, at least in the neighbourhood of the annealing zone, a cavity wall structure of which each wall consists of a plurality of partitions extending along the wall face to face and spaced in directions transverse to the wall, at least one of the spaced partitions in each wall of the cavity wall structure having a coating of refractory material selected from the group consisting of calcium fluoride, magnesium oxide, zinc oxide, calcium oxide, alumina, molybdenum trioxide, lead oxide and zirconia including 5% of calcium oxide, said coating forming a heat reflecting surface inhibiting the transmission of heat through the cavity wall structure from the interior of the lehr.

3. Apparatus according to claim 1 wherein the innermost partition in each wall of the cavity wall structure has its outer surface coated with said refractory material and a next partition has its inner surface coated with said refractory material.

4. Apparatus according to claim 3 wherein said next partition also has a coating of said refractory material on its outer surface.

5. Apparatus according to claim 1, wherein said partitions are substantially flat along substantially their full lengths, and each partition containing said coating comprises a solid sheet on which said coating is applied.

References Cited by the Examiner

UNITED STATES PATENTS 1,571,137  1/1926  Mulholland _____ 65—118

FOREIGN PATENTS 611,594  12/1960  Canada.

DONALL H. SYLVESTER, *Primary Examiner.*

A. D. KELLOGG, *Assistant Examiner.*